US012768739B2

(12) United States Patent
Wang et al.

(10) Patent No.: US 12,768,739 B2

(45) Date of Patent: Oct. 20, 2026

(54) DETECTION OF CHAMBER SEALING LEAKAGE

(71) Applicant: Taiwan Semiconductor Manufacturing Company, Ltd., Hsinchu (TW)

(72) Inventors: Chia-Hsi Wang, Hsinchu City (TW); Yen-Yu Chen, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 385 days.

(21) Appl. No.: 18/607,084

(22) Filed: Mar. 15, 2024

(65) Prior Publication Data

US 2025/0290819 A1 Sep. 18, 2025

(51) Int. Cl.
*G01M 3/26* (2006.01)

(52) U.S. Cl.
CPC .................................... *G01M 3/26* (2013.01)

(58) Field of Classification Search
None
See application file for complete search history.

(56) References Cited

U.S. PATENT DOCUMENTS

| | | | | |
|---|---|---|---|---|
| 10,060,812 | B2 * | 8/2018 | Lemery | G01L 9/0051 |
| 11,369,815 | B2 * | 6/2022 | Rachapudi | G01M 3/3218 |
| 2021/0131907 | A1 * | 5/2021 | Meehan | G01M 3/26 |

* cited by examiner

*Primary Examiner* — Suman K Nath

(74) *Attorney, Agent, or Firm* — Foley & Lardner LLP

(57) ABSTRACT

A sealing monitoring device for a chamber includes a support attached to a front of a sputtering target, and a pressure sensor attached to the support. The sensor is positioned vertically between the front of the target and a parallel top of a shield of the chamber parallel, and laterally positioned at a location adjacent to a sealing device of the chamber. The sensor is configured to sense a pressure at the location, and accordingly generates a voltage signal, which can be utilized by a processor to determine a sealing condition of the sealing device adjacent to the location.

20 Claims, 6 Drawing Sheets

DETECTION OF CHAMBER SEALING LEAKAGE

BACKGROUND

The semiconductor industry has experienced rapid growth due to ongoing improvements in the integration density of a variety of electronic components (e.g., transistors, diodes, resistors, capacitors, etc.). For the most part, improvement in integration density has resulted from iterative reduction of minimum feature size, which allows more components to be integrated into a given area.

While some integrated device manufacturers (IDMs) design and manufacture integrated circuits (IC) themselves, fabless semiconductor companies outsource semiconductor fabrication to semiconductor fabrication plants or foundries. Semiconductor fabrication consists of a series of processes in which a device structure is manufactured by applying a series of layers onto a substrate. This involves the deposition and removal of various thin film layers. The areas of the thin film that are to be deposited or removed are controlled through photolithography. Each deposition and removal process is generally followed by cleaning as well as inspection steps. Therefore, both IDMs and foundries rely on numerous semiconductor equipment and semiconductor fabrication materials, often provided by vendors. There is always a need for customizing or improving those semiconductor equipment and semiconductor fabrication materials, which results in more flexibility, reliability, and cost-effectiveness.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
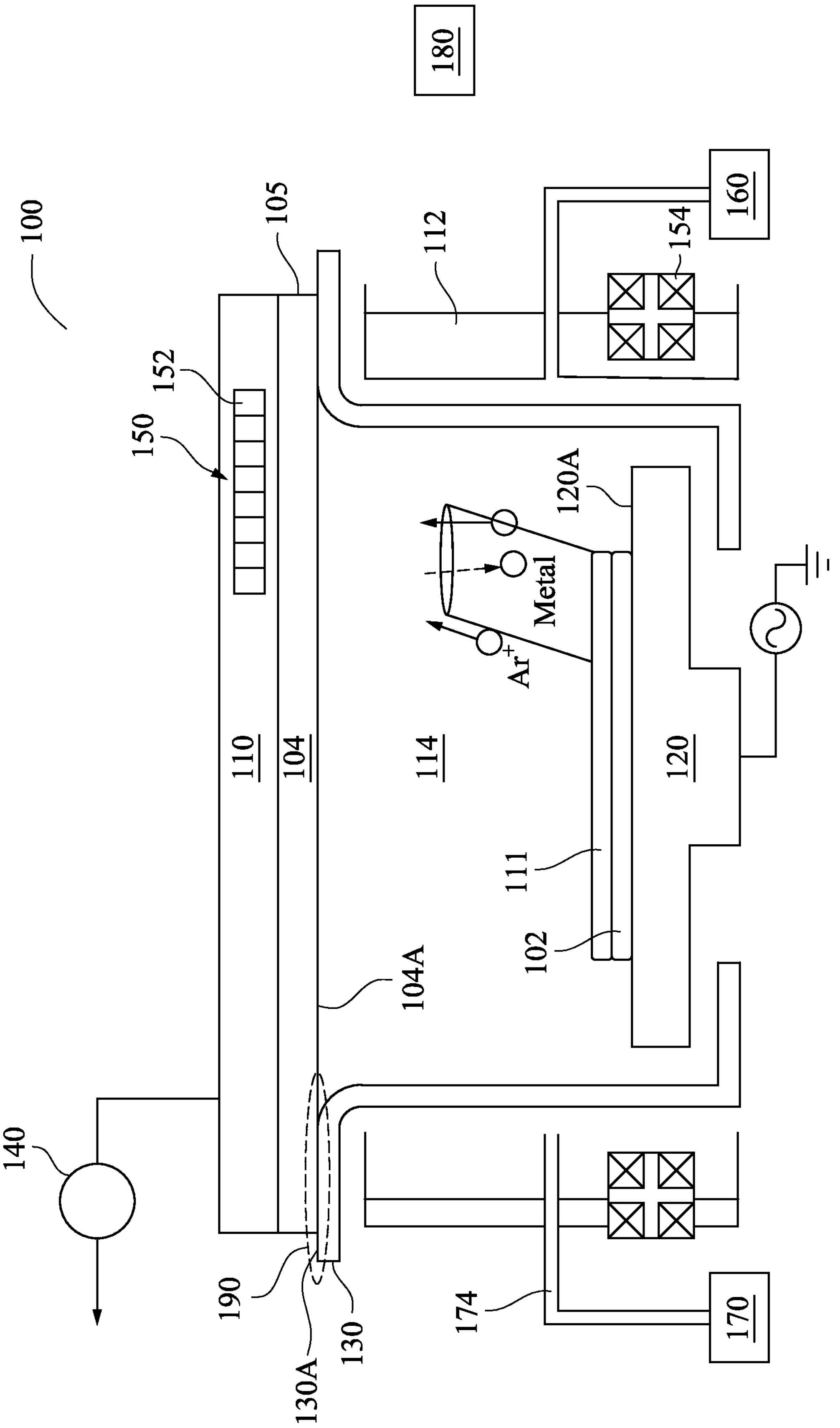
FIG. 1 illustrates a schematic view of a physical vapor deposition (PVD) system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Physical vapor deposition (PVD) is a common process for depositing a film of material on a substrate (or a wafer) and is commonly used in semiconductor fabrication. The PVD process or operation is carried out at a high vacuum in a chamber containing a substrate and a solid source or slab of the material (i.e., a "PVD target" or a "sputtering target") to be deposited on the substrate. In the PVD process, the PVD target is physically converted from a solid (phase) into a vapor (phase). The vapor of the target material is transported from the PVD target to the substrate, where it is condensed on the substrate as a film (again in the solid phase).

There are many methods for accomplishing PVD, including evaporation, e-beam evaporation, plasma spray deposition, and sputtering. Among those methods, in general, sputtering is the most frequently used method for accomplishing PVD. During sputtering, gas plasma is created in the chamber and directed to the PVD target. The plasma physically dislodges or erodes (sputters) atoms or molecules from the reaction surface of the PVD target into a vapor of the target material, as a result of a collision with high-energy particles (ions) of the plasma. The vapor of sputtered atoms or molecules of the target material is transported to the substrate through a region of reduced pressure and condenses on the substrate, forming the film of the target material. During a PVD process, a leakage of the high vacuum in the PVD chamber may cause disadvantageous impact on the wafer. Thus, a mechanism and method that can be utilized to monitor in real time the sealing condition of a PVD chamber and detect a vacuum leakage occurrence are highly desired.

The present disclosure provides various embodiments of a sealing monitoring device that can be used to monitor a PVD chamber. In some embodiments, the sealing monitoring device includes a support attached to a front of a PVD target, and at least one sensor attached to the support. The sensor is positioned vertically between the front (surface) of the target and a top (surface) of a shield of the chamber that are parallel to each other, and laterally at a location adjacent to a sealing device (such as an O-ring) of the chamber. The sensor is configured to sense a pressure at the location thereof and generate a voltage signal based on the pressure. Upon detecting a voltage of the voltage signal exceeding a threshold value, a vacuum leak occurrence of the chamber is determined adjacent to the location in real time. Upon detecting the vacuum leakage, appropriate actions (such as stopping the PVD process and adjusting a vacuum pump) can be performed, thereby advantageously maintaining PVD quality of a wafer.

FIG. 1 is a schematic view of a PVD system 100 in accordance with some embodiments of the present disclosure. The PVD system 100 can be configured to form (e.g., deposit) one or more materials (e.g., as a film) onto a substrate (or wafer). An example material includes a metallic material such as, for example, titanium, titanium nitride, tantalum, tantalum nitride, aluminum, titanium aluminide (gamma titanium). Other example materials include carbides, silicides, and borides for certain applications. According to various embodiments of the present disclosure, the formed film can include two or more portions, each of which has a thickness that can be individually controlled. Alternatively stated, none of the portions of the film needs to compensate for an unintentionally compromised (e.g., thinned) thickness of any other portion of the film.

As shown, a substate (or a wafer) 102, onto which a film 111 is formed, is placed on a substrate support 120 of a chamber body 112. During the PVD process, a PVD target 104 is bombarded by energetic ions, such as a plasma, causing material to be knocked off the target and deposited as the film 111 on the substrate 102. In some embodiments, the PVD system 100 may be a magnetron PVD system, in which the chamber body 112 encloses a processing region or a plasma zone (or a processing region) 114. The substrate support 120 has a substrate receiving surface 120A that receives and supports the substrate 102 during the PVD process, so that a surface of the substrate 102 is opposite to a (e.g., front) surface 104A of the PVD target 104 that is exposed to the processing region 114. The substrate support 120 is electrically conductive and is coupled to ground (GND) so as to define an electrical field between the PVD target 104 and the substrate 102. In some embodiments, the substrate support 120 is composed of aluminum, stainless steel, or ceramic material. In some embodiments, the substrate support 120 is an electrostatic chuck that includes a dielectric material.

A shield 130, also referred to as a dark space shield, is positioned inside the PVD chamber body 112 and proximate sidewalls (or edges) 105 of the PVD target 104 to protect inner surfaces of the chamber body 112 and sidewall (i.e., target sidewall 105) of the PVD target 104 from unwanted deposition. The shield 130 can be positioned very close to the target sidewall 105 to minimize re-sputtered material from being deposited thereon. In an edge region 190 of the PVD target 104, an edge of the front surface 104A of the PVD target 104 is in contact with a top surface 130A of the shield 130, and a sealing device (e.g., 260 in FIG. 4) is disposed therebetween, as such a vacuum environment can be formed in the processing region 114.

A power supply 140 is electrically coupled to a backing plate 110 of the PVD target 104. The power supply 140 is configured to negatively bias the PVD target 104 with respect to the chamber body 112 to excite a plasma-forming gas, for example, argon, into a plasma. In some embodiments, the power supply 140 is a direct current (DC) power supply source. In other embodiments, the power supply 140 is a radio frequency (RF) power supply source.

A magnet assembly 150 is disposed above the PVD target 104. The magnet assembly 150 is configured to project a magnetic field parallel to a front surface 104A of the PVD target 104 to trap electrons, thereby increasing the density of the plasma and increasing the sputtering rate. In some embodiments, the magnet assembly 150 is configured to scan about the back of the PVD target 104 to improve the uniformity of deposition. In some embodiments, the magnet assembly 150 includes a single magnet disposed above the PVD target 104 (not shown). In some embodiments, the magnet assembly 150 includes an array of magnets. In some embodiments and as shown in FIG. 1, the magnet assembly 150 includes one or more magnets 152 disposed above the PVD target 104. In some embodiments, the magnets 152 may spin during the deposition.

A gas source 160 is in fluidic combination with the chamber body 112 via a gas supply pipe. The gas source 160 is configured to supply a plasma-forming gas to the process region 114 via the gas supply pipe. The plasm-forming gas includes an inert gas and does not react with the materials in the PVD target 104. In some embodiments, the plasma-forming gas includes argon, xenon, neon, or helium, which is capable of energetically impinging upon and sputtering source material and the dopant from the PVD target 104. In some embodiments, the gas source 160 is also configured to supply a reactive gas into the PVD system 100. The reactive gas includes one or more of an oxygen-containing gas, a nitrogen-containing gas, a methane-containing gas, that is capable of reacting with the sputtering source material in the PVD target 104 to form the film 111 on the substrate 102.

A vacuum device 170 is in fluidic communication with the PVD system 100 via an exhaust pipe 174. The vacuum device 170 is used to create a vacuum environment in the PVD system 100 during the PVD process. In some embodiments, the PVD system 100 has a pressure in a range from about 1 mtorr to about 10 torr. The spent process gases and byproducts are exhausted from the PVD system 100 through the exhaust pipe 174. In some embodiments, the vacuum device 170 is a vacuum pump.

According to various embodiments of the present disclosure, the PVD system 100 further includes or is operatively coupled to a controller 180. The controller 180 is configured to adjust a variety of parameters associated with the PVD processes for depositing the film 111 on the substrate 102. Although not illustrated, it should be appreciated that the controller 180 can be operatively coupled to each of the above-described components of the PVD system 100. By adjusting the parameters, a thickness of each of different portions of the deposited film 111 can be individually controlled. For example, the controller 180 can individually configure, identify, or adjust a substate temperature, a process time, a magnetic field, an operation voltage, and etc., for the PVD process of each of the different portions. For example, the controller 180 can control the respective thicknesses of the different portions to be independent of a lifetime of the PVD target 104, by determining respectively different compensation functions. Further, the controller 180 can control the vacuum device 170 to adjust the vacuum extent in the PVD chamber.

Figure 2:
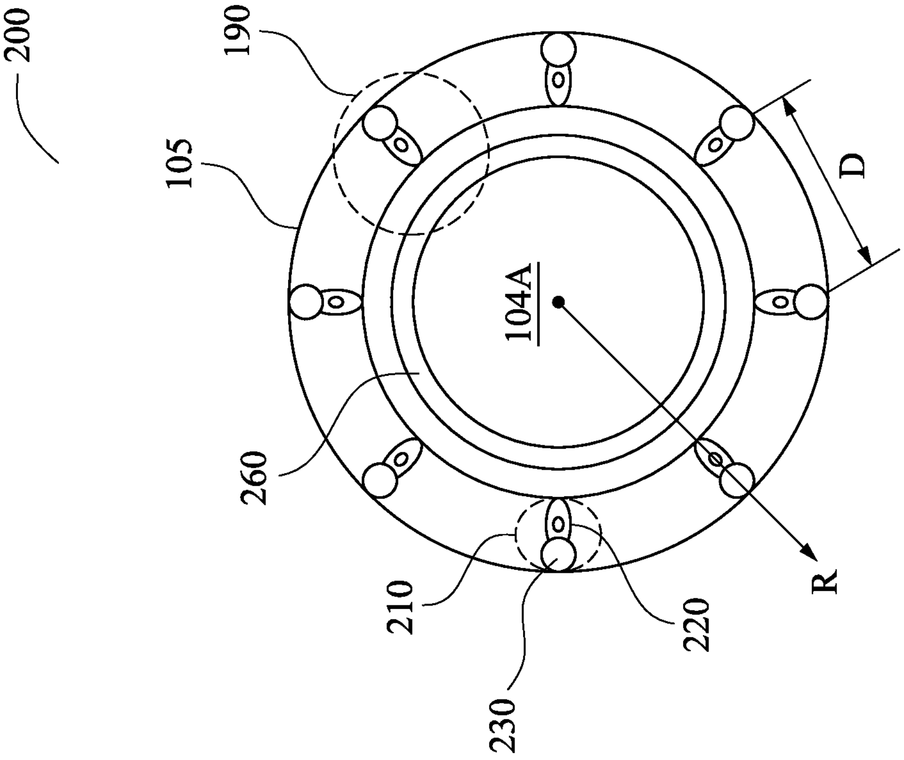
FIG. 2 is a top view of a PVD target having PVD sealing monitors mounted on the front surface thereof in accordance with an embodiment.

FIG. 2 is a top view 200 of a PVD target 104 having a plurality of PVD sealing monitoring devices (or monitors) 210 mounted on the front surface 104A of the PVD target 104 in accordance with an embodiment. In some embodiments, the front surface 104A of the PVD target 104 is in a circle shape. In some embodiments, as shown in FIG. 2, a sealing device 260 of the PVD chamber is embedded into the front surface 104A of the PVD target 104, and also embedded into a top surface 130A of a shield 130 to seal the PVD chamber (not shown). In some embodiments, the sealing device 260 is an O-ring. In some embodiments, the O-ring 260 is made of a material such as Nitrile (Buna), Neoprene, Ethylene Propylene (EPDM Rubber), Silicone, Fluorocarbon (Viton), and PTFE (Teflon), or a combination thereof.

As shown in FIG. 2, in some embodiments, the plurality of PVD sealing monitoring devices 210 are horizontally allocated in an edge region 190 of a front surface 104A of the target 104 adjacent to the sealing device 260. In some embodiments, the plurality of PVD sealing monitoring devices 210 are horizontally located between the sealing device 260 and an edge 105 of the PVD target 104. In some embodiments, the plurality of PVD sealing monitoring devices 210 are evenly distributed with an equal distance D in a ring that is located horizontally between the sealing device 260 and the edge 105 of the PVD target 104. In some embodiments, the plurality of PVD sealing monitoring devices 210 are located vertically between the front surface 104A of the target 104 and a top surface 130A of a shield 130 that are parallel to each other, which will be explained in more detail with respect to FIG. 4.

In some embodiments, a PVD sealing monitoring device 210 includes a support 220 attached to the front surface 104A of the PVD target 104, and a pressure sensor 230 attached to the support 220. In some embodiments, in the PVD sealing monitoring device 210, the support 220 and the pressure sensor 230 horizontally extend along the front surface 104A of the PVD target 104, and extend outwardly in a radial direction R of the circle of the front surface 104A of the PVD target 104. During the PVD process, the pressure sensor 230 is configured to be in contact with both the front surface 104A of the target 104 and the top surface 130A of the shield 130. In some embodiments, the PVD sealing monitoring device 210 also includes a radio frequency (RF) chip 240, which is electrically connected to the pressure sensor 230 and configured to transmit a voltage signal generated by the pressure sensor 230. The RF chip 240 will be further explained with respect to FIG. 4.

In some embodiments, the support 220 includes an elastomer that is made of a material that is selected from a group consisting of a poly-ether-ether-ketone (PEEK) material, a synthetic rubber material, a high polymer material, thermoplastic vulcanizate (TPV) material, a thermoplastic polyurethane (TPU) material, a thermoplastic polyester elastomer (TPEE) material, and a thermoplastic polyamide elastomer (TPEA) material. The elastomer 220 may function to support and carry the pressure sensor 230, and also protect an edge portion of the front surface 104A of the target 104 from being disadvantageously worn, for example, due to the vibration of the chamber during the PVD process.

In some embodiments, the pressure sensor 230 is configured to sense a pressure at the location thereof adjacent to the sealing device 260, and to generate a voltage signal based on the sensed pressure. In some embodiments, the pressure sensor 230 is made of a material selected from a group consisting of a piezoceramic material, a single crystalline material, and a polymer material, or a combination thereof. The pressure sensed by the pressure sensor 230 at the location thereof reflects a tilt extent (e.g., 0°, 1°, 2°, 3°, 4°, 5° . . . or more) of the front surface 104A of the PVD target 104 relative to the top surface 130A of the shield 130 at the location thereof, and thus the voltage signal having a voltage (e.g., 1V, 2V, 3V, 4V, 5V or more) generated by the pressure sensor 230 based on the sensed pressure also reflects such a tilt extent, which can be used to determine a sealing condition of the sealing device at this location.

For example, a voltage signal having a voltage value of 1V generated by the pressure sensor 230 reflects a tilt extent of 1 degree of the front surface 104A of the PVD target 104 relative to the top surface 130A of the shield 130 at the location of the pressure sensor 230, which indicates a satisfied sealing condition adjacent to the location of the pressure sensor 230. However, a voltage signal having a voltage value of 3V generated by the pressure sensor 230 reflects a tilt extent of 3° of the front surface 104A of the PVD target 104 relative to the top surface 130A of the shield 130 at the location of the pressure sensor 230, which indicates an unsatisfied sealing condition adjacent to the location of the pressure sensor 230, thereby a vacuum leakage being determined adjacent to the location of the pressure sensor 230.

Figure 3:
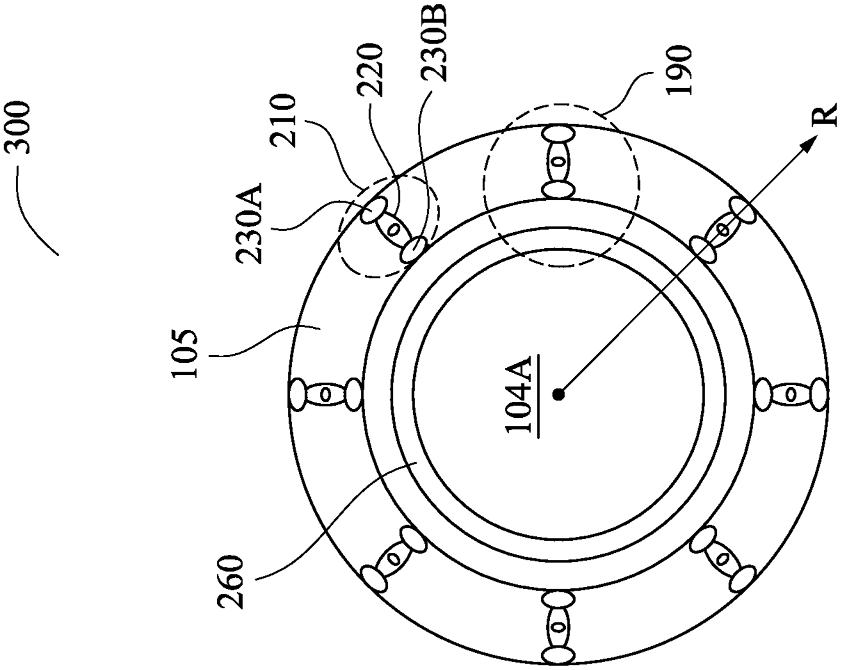
FIG. 3 is a top view of a PVD target having PVD sealing monitors mounted on the front surface thereof in accordance with another embodiment.

FIG. 3 is a top view 300 of a PVD target 104 having a plurality of PVD sealing monitoring devices (or monitors) 210 mounted on the front surface 104A of the PVD target 104 in accordance with another embodiment. The plurality of PVD sealing monitors 210 in FIG. 3 are similar to the plurality of PVD sealing monitors 210 in FIG. 2, but have some differences.

As shown in FIG. 3, in some embodiments, the front surface 104A of the PVD target 104 is in a circle shape, and each of the plurality of PVD sealing monitoring devices 210 includes a pair of pressure sensors 230A and 230B on opposite sides of the support 220. In some embodiments, the pair of pressure sensors 230A and 230B horizontally extend along the front surface 104A of the PVD target 104, and horizontally and outwardly extend in a radial direction R of the circle of the front surface 104A of the PVD target 104. Any one of the pair of pressure sensors 230A and 230B can be used to sense a pressure at the location of the sensor, which is laterally adjacent the sealing device 260 and vertically between the front surface 104A of the target 104 and the top surface 130A of the shield 130. The pressure sensed by any one of the pair of pressure sensors 230A and 230B can be used to determine a sealing condition of the dealing sealing device 260 adjacent to the location, which will be explained in more detail with respect to FIG. 5.

Figure 4:
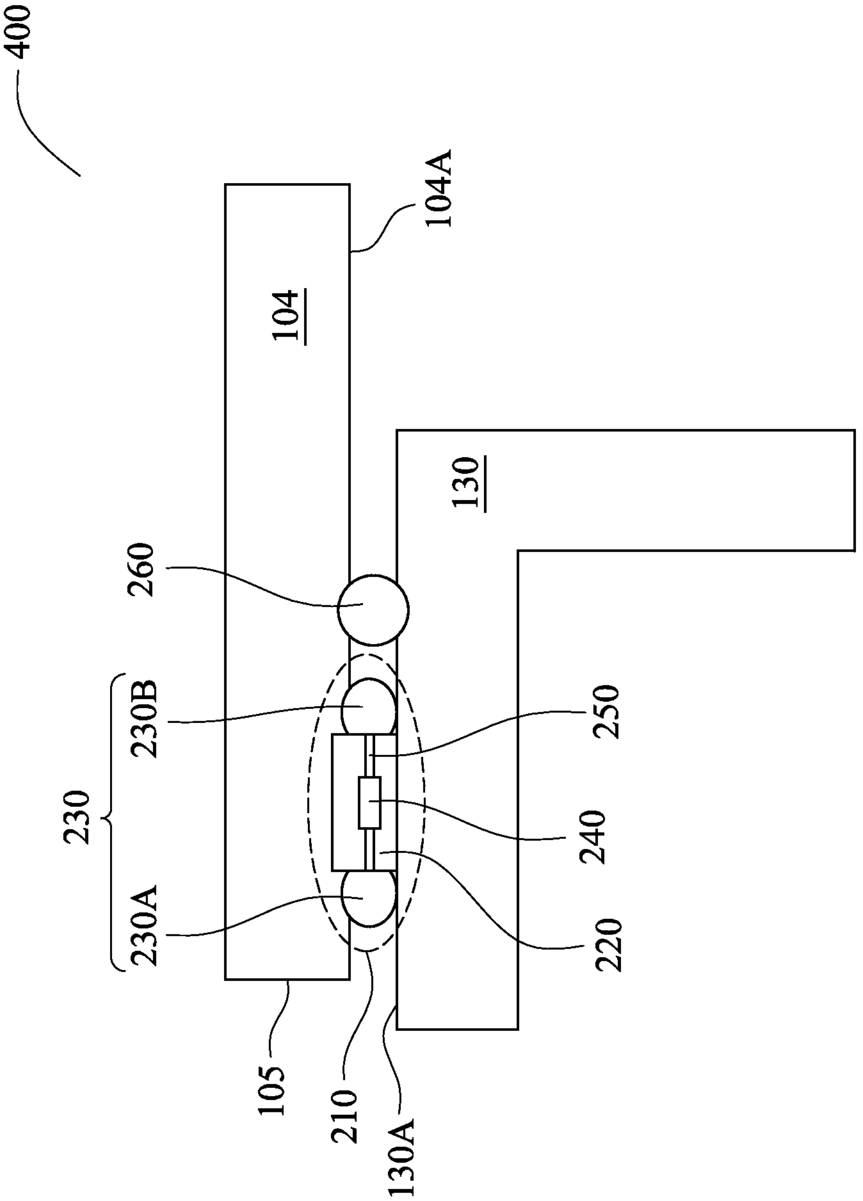
FIG. 4 is a cross-sectional side view of a PVD target having a PVD sealing monitor mounted on the front surface thereof in accordance with some embodiments.

FIG. 4 is a cross-sectional side view 400 of a PVD target 104 having a PVD sealing monitor 210 mounted on the front surface 104A thereof in accordance with some embodiments. In some embodiments, the PVD sealing monitor 210 includes a support 220 attached to a front surface 104A of a PVD target 104, one or more pressure sensors 230 (such as 230A and 230B) attached to the support 220, and a radio frequency (RF) chip 240 that is electrically connected to the one or more pressure sensors 230 via conductive lines 250 made of a metal material (such as Cu or Al) and configured to transmit the voltage signal received from the pressure sensors 230. In some embodiments, the RF chip 240 is embedded in the support device 220 as shown in FIG. 4, and in other embodiments, the RF chip 240 is positioned outside the support device 220 (not shown). In some embodiments, the target 104 and the shield 130 define a vacuum space (e.g., the processing region 114 in FIG. 1) that is sealed by a sealing device 260 (e.g., an O-ring).

In some embodiments, the PVD sealing monitor 210 is positioned vertically between the front surface 104A of the PVD target 104 and a top surface 130A of a shield 130 that are parallel to each other, and is positioned laterally at a location adjacent to the sealing device 260 of the PVD chamber. In some embodiments, any pressure sensor (e.g., 230A) of the pair of pressure sensors 230A and 230B of the PVD sealing monitor 210 is configured to sense a pressure at the location of the pressure sensor, and thus generate a voltage signal based on the sensed pressure, such that a sealing condition of the sealing device 260 adjacent to the location of the pressure sensor can be determined based on the generated voltage signal (e.g., by a processor 610 that will be explained in more detail with respect to FIG. 6).

For example, a voltage signal having a voltage of 1V generated by a pressure sensor 230 (such as 230A) reflects a tilt extent of 1 degree of the front surface 104A of the PVD target 104 relative to the top surface 130A of the shield 130 at the location of the pressure sensor, thereby indicating a satisfied sealing condition at the location. However, a voltage signal having a voltage of 3V (reaching or exceeding a voltage threshold 3V) generated by a pressure sensor 230 (such as 230A) reflects a tilt extent of 3° of the front surface 104A of the PVD target 104 relative to the top surface 130A of the shield 130 at the location of the pressure sensor, thereby indicating an unsatisfied sealing condition at the location and thus determining a vacuum leakage adjacent to the location.

Figure 5:
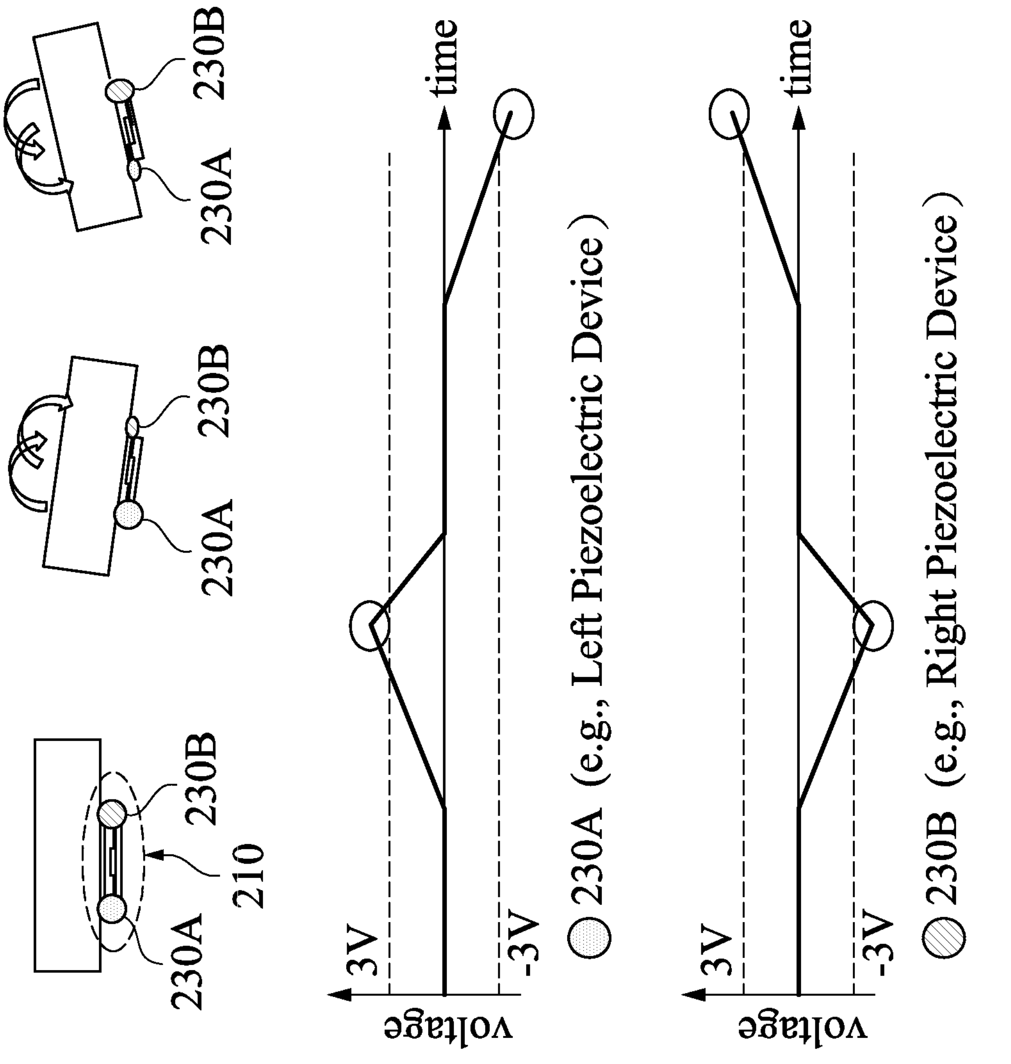
FIG. 5 illustrates example trend charts of a pair of pressure sensors of a PVD sealing monitor in accordance with some embodiments.

FIG. 5 illustrates example trend charts of a pair of pressure sensors 230A and 230B of a PVD sealing monitor 210 in accordance with some embodiments, which can be used to explain how the PVD sealing monitor 210 works. As aforementioned, during a PVD operation, the PVD sealing monitor 210 including the pair of pressure sensors 230A and 230B is positioned vertically between a front surface 104A of a PVD target 104 and a top surface 130A of a shield 130 of a PVD chamber that are parallel to each other, and is positioned laterally at a location adjacent to a sealing device 260 of the PVD chamber (in FIG. 4). However, due to some causes (such as vibrations of the PVD chamber during a PVD operation, and wears or aging of the sealing device 260 of the PVD chamber), the front surface 104A of the PVD target 104 and the top surface 130A of the shield 130 may not remain parallel to each other, can be tilted from each other at some locations along the front surface 104A of the PVD target 104, and thus can lead to a pressure on a pressure sensor (e.g., 230A) of the pair of pressure sensors 230A and 230B that can be sensed by the pressure sensor.

The pressure sensed by the pressure sensor (e.g., 230A) at the location of the pressure sensor reflects a tilt extent or degree (e.g., 1°, 2°, 3°, 4°, 5°, 6° or more) of the front surface 104A of the PVD target 104 relative to the top surface 130A of the shield 130 at the location of the pressure sensor, and thus the voltage signal having a voltage (e.g., 1V, 2V, 3V, 4V, 5V, 6V or more) generated by the pressure sensor based on the sensed pressure can be used to detect the tilt extent, which reflects a sealing condition of the sealing device (260 in FIG. 4) at the location.

For example, a voltage signal having a voltage of 1V generated by the pressure sensor 230 (such as 230A) reflects a tilt extent of 1 degree of the front surface 104A of the PVD target 104 relative to the top surface 130A of the shield 130 at the location of pressure sensor 230, which indicates a satisfied sealing condition at the location. However, a voltage signal having a voltage of 3V generated by the pressure sensor 230 reflects a tilt extent of 3 degree of the front surface 104A of the PVD target 104 relative to the top surface 130A of the shield 130 at the location of pressure sensor 230, which indicates an unsatisfied sealing condition at the location, thereby a vacuum leakage being determined at the location. In some embodiments, a threshold voltage is 3V, which corresponds to a tilt extent of 3 degree of the front surface 104A of the PVD target 104 relative to the top surface 130A of the shield 130. As such, the voltage signal generated by the pressure sensor 230 (such as 230A) can be used to detect a sealing condition of the PVD chamber to determine a vacuum leakage occurrence of a sealing device 260 and a location of the vacuum leakage occurrence.

Figure 6:
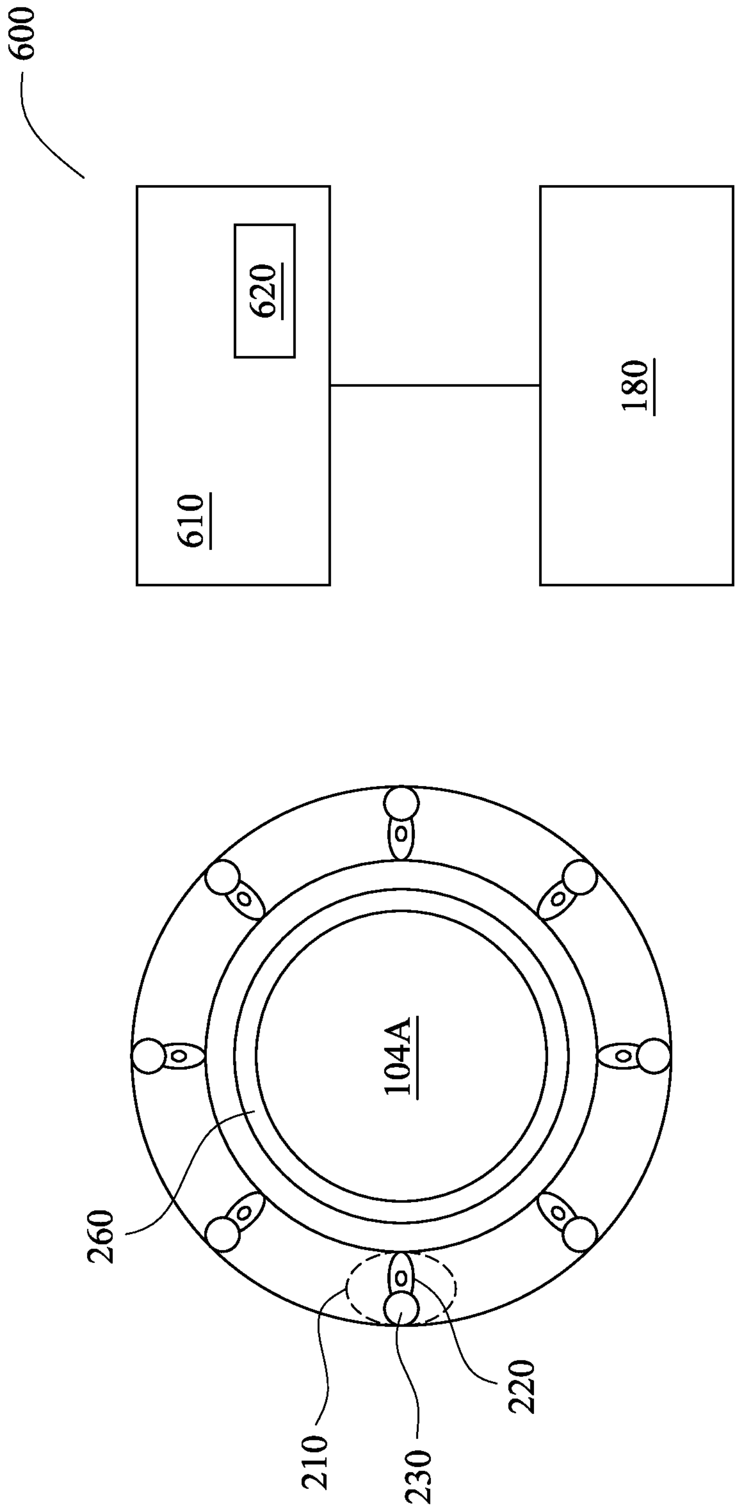
FIG. 6 illustrates a schematic view of a system of detecting a sealing condition in a PVD system in accordance with some embodiments.

FIG. 6 illustrates a schematic view of a system 600 of detecting a sealing condition in a PVD system 100 in accordance with some embodiments. In some embodiments, the system 600 includes plural PVD sealing monitoring devices 210 configured to sense plural pressures at plural locations and generate plural voltage signals each having a voltage value based on the sensed pressures, a processor 610 configured to receive the plural voltage signals from the PVD sealing monitoring devices 210 and determine a sealing condition of a sealing device 260 of a PVD chamber, and a controller 180 configured to perform one or more actions based on a determination regarding the sealing condition of the sealing device 260 made by the processor 610. In some embodiments, as aforementioned, each of the PVD sealing monitoring devices 210 includes a support 220 attached to a front surface 104A of a PVD target 104, at least one pressure sensor 230 attached to the support 220, and a RF chip 240 (in FIG. 4) that is electrically connected to the at least one pressure sensor 230 and configured to transmit a voltage signal received from the at least one pressure sensor 230.

In some embodiments, the processor 610 is configured to receive the voltage signal transmitted by the RF chip 240 and to determine a sealing condition adjacent to the location of the pressure sensor 230 of the PVD sealing monitoring device 210 based on a voltage value of the voltage signal. For example, upon receiving a voltage signal having a voltage of 1V (less than a threshold value e.g., 3V) generated by a pressure sensor 230 of a PVD sealing monitoring device 210 of the plural sealing monitoring devices at a location adjacent to a sealing device 260, the processor 610 determines a satisfied sealing condition of the sealing device 260 adjacent to the location. Otherwise, upon receiving a voltage signal having a voltage of 3.2V (reaching or exceeding a threshold value 3V) generated by a pressure sensor 230 of a PVD sealing monitoring device 210 of the plural sealing monitoring devices at a location adjacent to the sealing device 260, the processor 610 determines an unsatisfied sealing condition (such as a vacuum leakage occurrence) of the sealing device 260 adjacent to the location. In some embodiments, upon determining a vacuum leakage occurrence, the processor 610 is configured to transmit a notice of the vacuum leakage occurrence of the sealing device 260.

In some embodiments, upon receiving the notice of the vacuum leakage occurrence of the sealing device 260, the controller 180 is configured to perform at least one of the actions selected from a group consisting of stopping the PVD process, adjusting a vacuum pressure via a vacuum device 170 (in FIG. 1) connected to the PVD chamber, or a combination thereof.

Figure 7:
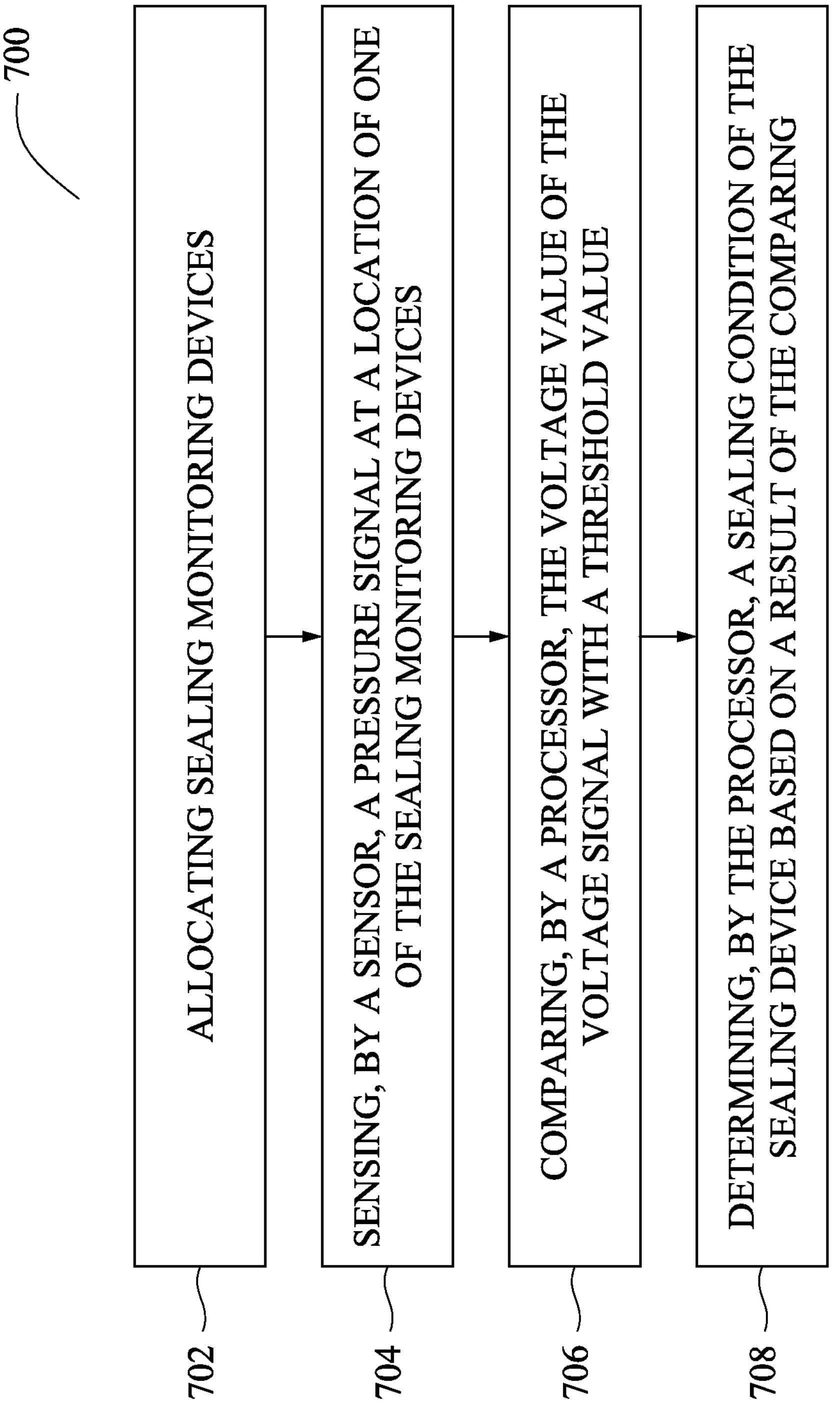
FIG. 7 is a flow chart of a method of detecting a sealing condition in a PVD system in accordance with some embodiments.

FIG. 7 is a flow chart of a method 700 of detecting a sealing condition in a PVD system 100 in accordance with some embodiments. It should be noted that the method 700 is merely an example, and is not intended to limit the present disclosure. Accordingly, it is understood that the order of operation of the method 700 of FIG. 7 can change, that additional operations may be provided before, during, and after the method 700 of FIG. 7, and that some other operations may only be described briefly herein.

A plurality of PVD sealing monitoring devices 210 (in FIGS. 2-4) can be used to monitor the sealing condition of a PVD chamber of the PVD system 100. In some embodiments, each of the plurality of PVD sealing monitoring devices 210 includes a support 220 attached to a front surface 104A of a PVD target 104, at least one pressure sensor 230 attached to the support 220, and an RF chip 240 electrically connected to the at least one pressure sensor 230 and configured to transmit a voltage signal having a voltage value received from the at least one pressure sensor 230. In some embodiments, the RF chip 240 is embedded in the support 220, while in other embodiments, the RF chip 240 is installed outside the support 220.

Referring to FIGS. 2-4 and 7, the method 700 starts with operation 702 of allocating a plurality of PVD sealing monitoring devices 210 on a front surface 104A of a PVD target 104. For example, the plurality of PVD sealing monitoring devices 210 are horizontally allocated in an edge region 190 adjacent to the sealing device 260. The plurality of PVD sealing monitoring devices 210 are located horizontally between a sealing device 260 and an edge 105 of the PVD target 104, and vertically between the front surface 104A of the target 104 and a top surface 130A of a shield 130 that are parallel to each other.

Next, referring to FIGS. 2-4 and 7, the method 700 proceeds to operation 704 of sensing, by a pressure sensor 230 of a PVD sealing monitoring device 210 of the plurality of sealing monitoring devices, a pressure at a location of the PVD sealing monitoring device 210. As such, a voltage signal having a voltage value is generated by the pressure sensor 230 based on the sensed pressure. In some embodiments, the pressure sensor 230 is made of a material selected from a group consisting of a piezoceramic material, a single crystalline material, and a polymer material, and is configured to transfer a sensed pressure into a voltage signal.

Next, referring to FIGS. 6 and 7, the method 700 proceeds to operation 706 of comparing, by a processor 610, the voltage value of the voltage signal with a threshold value. For example, the voltage signal generated by the pressure sensor 230 is transmitted to a RF chip 240 that is electrically connected to the pressure sensor 230, in turn the voltage signal is transmitted by the RF chip 240 to outside the PVD sealing monitoring device 210, and then received by the processor 610. In some embodiments, the threshold value (e.g., 3 V) can be stored in a data storage 620 in the processor 610 and can be accessed by the processor 610, while in other embodiments, the threshold value can be stored outside the processor 610 and can be accessed by the processor 610. The voltage value of the voltage signal received from the pressure sensor 230 by the processor 610 can be less than, equal to, or greater than the threshold value.

Next, referring to FIGS. 6 and 7, the method 700 proceeds to operation 708 of determining, by the processor 610, a sealing condition of the sealing device 260 adjacent to the location of the PVD sealing monitoring device 210 based on a result of the comparing of the voltage value of the voltage signal with the threshold value. For example, upon finding a voltage value (e.g., 2.5 V) of the voltage signal from the PVD sealing monitoring device 210 is less than the threshold value (e.g., 3 V), the processor 610 determines no sealing leak occurrence at the location of the PVD sealing monitoring device 210, otherwise upon finding a voltage value (e.g., 3.1 V) of the voltage signal from the PVD sealing monitoring device 210 is exceeding the threshold value (e.g., 3 V), the processor 610 determines a sealing leak occurrence at the location of the PVD sealing monitoring device 210.

In some embodiments, upon determining the sealing leak occurrence, the processor 610 transmits a notice of the sealing leak occurrence outside the processor 610. In some embodiments, the notice of the sealing leak occurrence includes a location information of the sealing leak occurrence based on the location of the one of the plurality of PVD sealing monitoring devices 210 that has generated the volage signal having a voltage value reaching or exceeding the threshold value (e.g., 3 V). In some embodiments, referring to FIGS. 1 and 6, upon receiving the notice of the sealing leak occurrence from the processor 610, a controller 180 is configured to perform one or more actions, such as stopping the PVD process, and adjusting a vacuum pressure by a vacuum device 170 connected to the PVD chamber, or a combination thereof.

In this way, the sealing condition (such as a vacuum leakage occurrence) of a PVD chamber can be detected in real time by the detecting system, and upon detecting the vacuum leakage occurrence, appropriate actions can be performed, thereby advantageously maintaining wafer PVD quality. In the present disclosure, the device, system and method of detecting a sealing condition of an example PVD chamber in real time are illustrated, however they are not limited to be applied to a PVD chamber and can be applied to other semiconductor processing chambers, such as a chemical vapor deposition (CVD) chamber, an etching chamber, and a lithography chamber, etc.

In one aspect of the present disclosure, a sealing monitoring device is disclosed. The sealing monitoring device includes a support attached to a front of a physical vapor deposition (PVD) target, and a pressure sensor that is attached to the support, positioned vertically between the front of the target and a top of a shield of a PVD chamber parallel to each other, laterally at a location adjacent to a sealing device of the chamber, and configured to sense a pressure at the location and detect a sealing condition of the sealing device adjacent to the location.

In another aspect of the present disclosure, a sealing monitoring system for a physical vapor deposition (PVD) chamber is disclosed. The sealing monitoring system includes a plurality of sealing monitoring devices and a processor. Each of the plurality of sealing monitoring devices includes a support attached to a front of a PVD target, at least one pressure sensor attached to the support, and a radio frequency (RF) chip electrically connected to the sensor and configured to transmit a voltage signal. The at least one pressure sensor is positioned vertically between the front of the target and a top of a shield of the chamber parallel to each other, laterally positioned at a location adjacent to a sealing device of the chamber, and configured to sense a pressure at the location and generate the voltage signal based on the pressure. The processor is configured to receive the voltage signal and determine a sealing condition adjacent to the location based on the voltage signal.

In yet another aspect of the present disclosure, a method of monitoring a sealing condition of a physical vapor deposition (PVD) chamber is disclosed. The method includes allocating a plurality of sealing monitoring devices on a front of a target. Each of the plurality of sealing monitoring devices includes a support attached to the front of the target, and at least a pressure sensor attached to the support, positioned vertically between the front of the target and a top of a shield of the chamber parallel to each other, and laterally positioned adjacent to a sealing device of the chamber. The method also includes sensing, by the sensor, a pressure at a location of one of the plurality of sealing monitoring devices, in which a voltage signal is generated by the sensor based on the pressure and is transmitted by a radio frequency (RF) chip. The method further includes receiving, by a processor, the voltage signal, comparing, by the processor, the voltage signal with a threshold value that is stored in the processor, and determining, by the processor, a sealing condition of the sealing device adjacent to the location based on a result of the comparing of the voltage signal with the threshold value.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A sealing monitoring device, comprising:

a support attached to a front of a sputtering target; and a pressure sensor attached to the support, wherein the sensor is positioned vertically between the front of the sputtering target and a top of a shield of a chamber parallel to each other, and laterally at a location adjacent to a sealing device of the chamber, and wherein the sensor is configured to sense a pressure at the location and detect a sealing condition of the sealing device adjacent to the location.

2. The sealing monitoring device of claim 1, further comprising:

a radio frequency (RF) chip electrically connected to the sensor, and configured to transmit a voltage signal received from the sensor.

3. The sealing monitoring device of claim 2, wherein the RF chip is embedded in the support.

4. The sealing monitoring device of claim 1, wherein the support comprises an elastomer that is made of a material selected from a group consisting of a poly-ether-ether-ketone (PEEK) material, a synthetic rubber material, a high polymer material, thermoplastic vulcanizate (TPV) material, a thermoplastic polyurethane (TPU) material, a thermoplastic polyester elastomer (TPEE) material, and a thermoplastic polyamide elastomer (TPEA) material.

5. The sealing monitoring device of claim 1, wherein the sensor is in contact with the front of the sputtering target and the top of the shield.

6. The sealing monitoring device of claim 1, wherein the sensor is made of a material selected from a group consisting of a piezoceramic material, a single crystalline material, and a polymer material.

7. The sealing monitoring device of claim 1, wherein the sputtering target and the shield of the chamber are configured to define a vacuum space that is sealed by the sealing device.

8. The sealing monitoring device of claim 1, wherein the sealing device of the chamber comprises an O-ring.

9. The sealing monitoring device of claim 1, wherein the sensor is configured to generate a voltage signal based on the pressure, and to detect the sealing condition of the sealing device at the location based on the voltage signal.

10. The sealing monitoring device of claim 9, wherein upon detecting a voltage of the voltage signal exceeding a threshold value, a sealing leakage of the chamber is determined at the location.

11. A sealing monitoring system for a chamber, comprising:

a plurality of sealing monitoring devices each comprising:

a support attached to a front of a sputtering target;

at least a pressure sensor attached to the support, positioned vertically between the front of the sputtering target and a top of a shield of the chamber parallel to each other, laterally positioned at a location adjacent to a sealing device of the chamber, and configured to sense a pressure at the location and generate a voltage signal based on the pressure; and a radio frequency (RF) chip electrically connected to the sensor and configured to transmit the voltage signal; and a processor configured to receive the voltage signal and to determine a sealing condition adjacent to the location based on the voltage signal.

12. The system of claim 11, further comprising:

a controller configured to perform at least an action based on a determination made by the processor.

13. The system of claim 11, wherein the plurality of sealing monitoring devices are evenly allocated with an equal distance in a ring between an edge region of the front of the sputtering target and the sealing device.

14. The system of claim 11, wherein the front of the sputtering target is in a circle shape, and wherein each of the plurality of sealing monitoring devices comprises a pair of sensors on opposite sides the support, extending horizontally and outwardly along the front of the sputtering target and in a radial direction of the front of the sputtering target.

15. The system of claim 11, wherein the sputtering target and the shield of the chamber are configured to define a space to be sealed by the sealing device and to be vacuumed.

16. The system of claim 11, wherein the voltage signal is configured to indicate the sealing condition at the location adjacent to the sealing device.

17. The system of claim 16, wherein upon detecting a voltage of the voltage signal from first one of the plurality of sealing monitoring devices exceeding a threshold value, a sealing leakage is determined at the location of the one of the plurality of sealing monitoring devices.

18. A method of monitoring a sealing condition of a chamber, comprising:

allocating a plurality of sealing monitoring devices on a front of a sputtering target, wherein each of the plurality of sealing monitoring devices comprises:

a support attached to the front of the sputtering target; and at least a pressure sensor attached to the support, positioned vertically between the front of the sputtering target and a top of a shield of the chamber parallel to each other, and laterally positioned adjacent to a sealing device of the chamber;

sensing, by the sensor, a pressure at a location of one of the plurality of sealing monitoring devices, wherein a voltage signal is generated by the sensor based on the pressure and is transmitted by a radio frequency (RF) chip;

comparing, by the processor, the voltage signal with a threshold value, wherein the threshold value is stored in the processor; and determining, by the processor, a sealing condition of the sealing device adjacent to the location based on a result of the comparing of the voltage signal with the threshold value.

19. The method of claim 18, wherein upon finding a value of a first voltage signal of a first one of the plurality of sealing monitoring devices exceeding the threshold value, the processor determines a sealing leakage at a first location of the first one of the plurality of sealing monitoring devices, and wherein the processor transmits a notice of the sealing leakage.

20. The method of claim 19, further comprising:

upon receiving the notice of the sealing leakage by a controller, stopping a process by the controller.

* * * * *